(12) United States Patent  (10) Patent No.: US 9,500,208 B2
Graham et al.  (45) Date of Patent: Nov. 22, 2016

(54) MAGNETIC PRELOADING OF JOINTS

(71) Applicant: Apple Inc., Cupertino, CA (US)

(72) Inventors: Christopher S. Graham, Cupertino, CA (US); Stephen E. Yao, Cupertino, CA (US); Eric S. Jol, Cupertino, CA (US); Makiko K. Brzezinski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 14/262,455

(22) Filed: Apr. 25, 2014

(65) Prior Publication Data

US 2015/0308470 A1  Oct. 29, 2015

(51) Int. Cl.
    *F16B 1/00* (2006.01)
(52) U.S. Cl.
    CPC .......... *F16B 1/00* (2013.01); *F16B 2001/0035* (2013.01)
(58) Field of Classification Search
    CPC . F16B 1/00; F16B 2001/0035; Y10S 403/01
    See application file for complete search history.

(56) References Cited

U.S. PATENT DOCUMENTS

| 1,236,234 | A | * | 8/1917 | Troje | ................... A63H 33/046 269/8 |
|---|---|---|---|---|---|
| 6,870,732 | B2 | | 3/2005 | Huang et al. | |
| 7,273,404 | B2 | | 9/2007 | Kowalski et al. | |
| 8,599,542 | B1 | | 12/2013 | Healey et al. | |
| 8,625,263 | B2 | | 1/2014 | Pu et al. | |
| 8,646,999 | B2 | | 2/2014 | Shaw et al. | |
| 2010/0035441 | A1 | | 2/2010 | Rohrbach et al. | |
| 2011/0154716 | A1 | * | 6/2011 | Turner | ................... A01K 91/04 43/43.13 |
| 2013/0170126 | A1 | | 7/2013 | Lee | |
| 2013/0258270 | A1 | | 10/2013 | Cazalet et al. | |
| 2014/0105682 | A1 | | 4/2014 | Chen | |

FOREIGN PATENT DOCUMENTS

| CN | 101097462 | | | 1/2008 | |
|---|---|---|---|---|---|
| CN | 101631437 | | | 1/2010 | |
| CN | 102196690 | | | 9/2011 | |
| CN | 103298287 | | | 9/2013 | |
| DE | EP 0799998 | A1 | * | 10/1997 | .......... F04C 15/0042 |
| DE | 1020060553415 | | | 12/2007 | |
| DE | 102007032568 | A1 | * | 2/2009 | ............. E05C 19/16 |
| DE | 102010003952 | A1 | * | 10/2011 | ........... H01F 7/0252 |
| DE | 102012000027 | A1 | * | 7/2013 | ......... A47B 47/0091 |
| FR | 3018871 | A1 | * | 9/2015 | ......... B60R 13/0206 |

(Continued)

OTHER PUBLICATIONS

International Search Report and Written Opinion, PCT/US2015/021305, 10 pages, Jun. 26, 2015.

*Primary Examiner* — Daniel P Stodola
*Assistant Examiner* — Jonathan Masinick

(57) ABSTRACT

A first component is coupled to a second component by one or more joints. Magnetic force between at least a first magnetic and second magnetic unit preloads the joint by placing the joint in compression. The first and second magnetic units may be respectively coupled to the first and second components. The magnetic force acts as a retentive force between coupled components and/or the joint and operates to resist one or more tensile and/or other opposing forces. In some cases, the first magnetic unit may be a shield, such as a direct current shield, that protects one or more components from a magnetic field of the second magnetic unit.

20 Claims, 5 Drawing Sheets

(56) References Cited

FOREIGN PATENT DOCUMENTS

| GB | 2434177 | 7/2007 |
| JP | 200624821 | 1/2006 |
| TW | 200901860 | 1/2009 |

* cited by examiner

MAGNETIC PRELOADING OF JOINTS

TECHNICAL FIELD

This disclosure relates generally to joints, and more specifically to magnetic preloading of joints.

BACKGROUND

Electronic devices and other apparatuses frequently utilize joints to couple components together. For example, joints may be utilized to couple an interface surface to a housing, a main logic board to a housing, a main logic board to an interface surface, and/or other various components to other various components. Such joints may be adhesive joints, welds, solder joints, bolted joints, and/or any other kind of technique utilized to couple components.

Components joined by such a joint may be subject to various tensile forces. Such tensile forces may be forces exerted on the components and/or joint that, if sufficient, may tear the components and/or the joint apart. If such tensile forces exceed the tensile strength of the joint, the joint may fail. This may cause the joint and/or the components to partially or fully separate.

SUMMARY

The present disclosure discloses systems, apparatuses, and methods for magnetic preloading of joints. A first component may be coupled to a second component by one or more joints. Magnetic force between at least a first magnetic and second magnetic unit may preload the joint by placing the joint in compression. In some cases, the first and second magnetic units may be respectively coupled to the first and second components. Thus, the magnetic force may be a retentive force between coupled components and/or the joint.

In some implementations, the first and second component, the first and second magnetic units, and the joint may be incorporated into an apparatus such as an electronic device. Such an electronic device may be connectible to another electronic device via one or more third magnetic units that attract the second magnetic unit. In such cases, the second component may be an interface surface for connecting the two electronic devices and the attraction between the second and third magnetic units that occurs when the two apparatuses are connected may exert tensile and/or other opposing forces on the first component, second component, and/or the joint.

In various cases, the first and/or second magnetic unit may be a shield. Such a shield, such as a direct current shield, may shield one or more components from the first and/or second magnetic unit. In some cases, the first and/or second magnetic unit may include one or more ferromagnetic materials, permanent magnets, electromagnets, and/or other such magnetic materials. The first and/or the second component may be formed of one or more rigid materials such as metal, glass, ceramic, plastic, crystal, ferromagnetic material, and/or other such materials.

In some implementations, a system for magnetic preloading of joints includes a first component, a second component, at least one joint that couples the first component and the second component, and at least a first magnetic unit and a second magnetic unit. Magnetic force between the first magnetic unit and the second magnetic unit preloads the at least one joint by placing the at least one joint in compression.

In various implementations, an apparatus includes a first component, a second component, at least one joint that couples the first component and the second component, and at least a first magnetic unit coupled to the first component and a second magnetic unit coupled to the second component. Magnetic force between the first magnetic unit and the second magnetic unit preloads the at least one joint by placing the at least one joint in compression.

In some implementations, a method for magnetic preloading of joints includes: coupling a first component and a second component to form at least one joint therebetween; positioning at least a first magnetic unit and a second magnetic unit, at least one of the first magnetic unit or the second magnetic unit operationally affixed to one of the first component or the second component; and preloading the at least one joint by placing the at least one joint in compression as a result of magnetic force between the first magnetic unit and the second magnetic unit.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, methods, and apparatuses that embody various elements of the present disclosure. However, it should be understood that the described disclosure may be practiced in a variety of forms in addition to those described herein.

The present disclosure discloses systems, apparatuses, and methods for magnetic preloading of joints. A first component may be coupled to a second component by one or more joints. Magnetic force between at least a first magnetic and second magnetic unit (which may be respectively coupled to the first and second components and/or may be the respective first and second components) may preload the joint by placing the joint in compression. Thus, the magnetic force may be a retentive force between coupled components and/or the joint. As a result of such preloading, the joint and/or coupled components may resist tensile and/or other opposing forces greater than would otherwise be possible.

In some cases, the first and second component, the first and second magnetic units, and the joint may be incorporated into an apparatus such as an electronic device. Such an apparatus may be connectible to another electronic device via one or more third magnetic units that attract the second magnetic unit. In such cases, the second component may be an interface surface for connecting the two apparatuses and the tensile and/or other opposing forces may be the attraction between the second and third magnetic units that occurs when the two apparatuses are connected.

In various cases, the first and/or second magnetic unit may be a shield. Such a shield, such as a direct current shield, may shield one or more components (such as electronic components) from the first and/or second magnetic unit. In some cases, the first and/or second magnetic unit may include one or more ferromagnetic materials (such as iron cobalt), permanent magnets, electromagnets, and/or other such magnetic materials. The first and/or the second component may be formed of one or more rigid materials such as metal, glass, plastic, ceramic, crystal, ferromagnetic material, and/or other such materials.

Figure 1A:
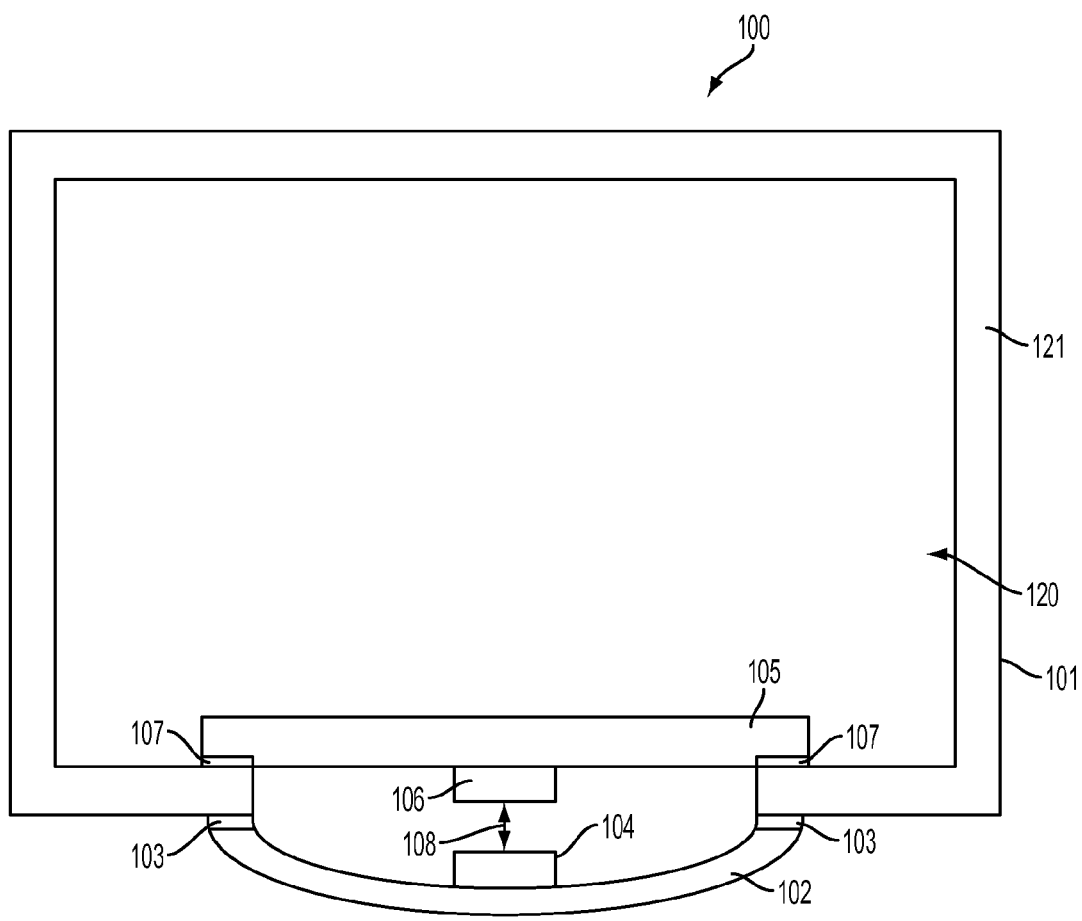
FIG. 1A is a side view of a first example system for magnetic preloading of joints.

FIG. 1A is a side view of a first example system 100 for magnetic preloading of joints. As illustrated, the system may include an apparatus 101 that includes may include a housing 121, an internal space 120, a first component 105 coupled to the housing by joints 107, and a second component 102 coupled to the housing by joints 103.

The joints 107 may be adhesive joints, welds, solder joints, bolted joints, and/or any other technique utilized to couple components such as the first component 105 and the housing 121. Similarly, the joints 103 may involve any technique utilized to couple components such as the housing 121 and the second component 102.

In some embodiment, the first component 105 may be formed of one or more rigid materials such as glass, plastic, metal, crystal, ceramic, ferromagnetic material, and/or any other such rigid material. Similarly, the second component may be formed of one or more rigid materials in some embodiments, such as those listed above.

As also illustrated in FIG. 1A, the apparatus 101 may include at least a first magnetic unit 106 and a second magnetic unit 104, each of which may be formed of one or more ferromagnetic materials, permanent magnets, electromagnets, soft magnetic materials (ferromagnetic and/or other materials that magnetize in the presence of a magnetic field and demagnetize when that magnetic field is removed), and/or other such magnetic materials. The first and second magnetic units may be configured such that they are attracted to each other by a magnetic force 108.

This magnetic force 108 between the first and second magnetic units 106 and 104 may preload the joints 107 and/or 103 by placing the joints in compression. When tension is applied to the joints as a separating force, the compressive preload may resist a certain amount of that tension, thus essentially negating that tension. Only when the tension exceeds the compression may the joints experience tension. Absent tension, the joints may not separate. As such, a retentive force may exist between the joints and/or the first and second components 105 and 102. This retentive force may resist an opposing or tensile force which may tend to separate the joints and/or the first and second components 105 and 102. This retentive force may also resist one or more shear and/or other forces exerted upon the first component, second component, and or the joints.

As a result of this retentive force, the joints 107 and/or 103 may have a higher tensile strength than that of the joints in the absence of the magnetic force 108. This may enable different joining techniques than would otherwise have sufficient tensile strength to withstand tensile and/or other forces that may be exerted on the joints and/or the first and/or second components 105 and 102.

Figure 1B:
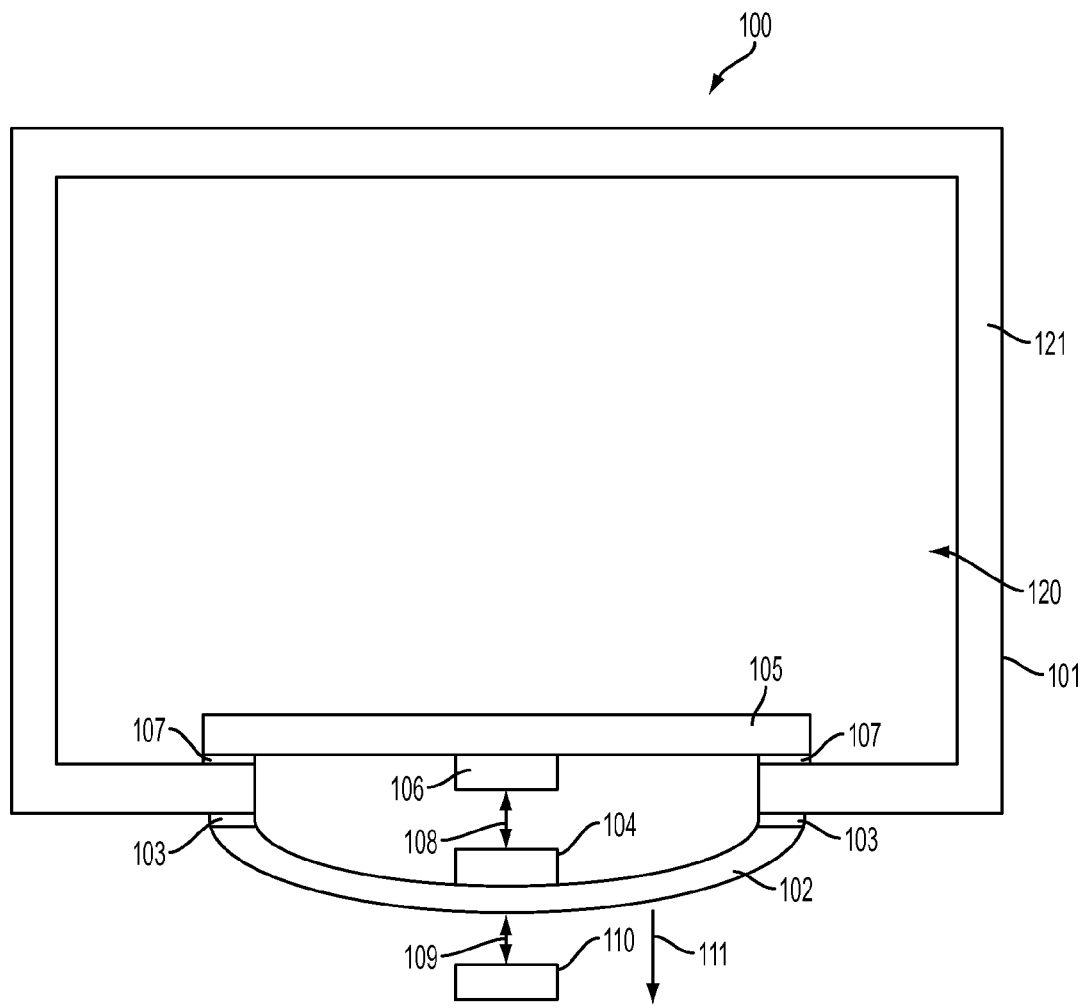
FIG. 1B illustrates the system of FIG. 1A with the addition of a third magnetic unit.

For example, FIG. 1B illustrates the system 100 of FIG. 1A with the addition of a third magnetic unit 110. The third magnetic unit may be configured to attract the second magnetic unit with an additional magnetic force 109. This additional magnetic force may pull the second component 102 and/or the joints 103 in the direction 111, opposing the magnetic force 108 and thus being an opposing force. As such, the additional magnetic force may be a tensile force on the second component and/or the joints.

However, due to the constant compression of the joints 103 by the magnetic force 108, the magnetic force may resist the additional magnetic force 109. This may prevent separation of the joint 103 and/or the second component 102 from the housing 121 and/or the first component 105.

In some cases, the strength of the magnetic force 108 between the first magnetic unit 106 and the second magnetic unit 104 may be related to various factors such as the individual strengths of the first and/or second magnetic units, distance between the first and second magnetic units, shapes of the first and second magnetic units, components utilized to focus magnetic flux of the first and/or second magnetic units, and/or other such factors. One or more such factors may be tuned in design of the apparatus 101 in order to have the constant compression of the joints 103 and/or 107 meet or exceed various opposing forces acting on the joints.

For example, in implementations where the apparatus 101 is configured to be connected to another apparatus by the third magnetic unit 110, the various factors influencing the strength of the magnetic force 108 between the first magnetic unit 106 and the second magnetic unit 104 may be tuned such that the strength will meet or exceed the additional magnetic force 109 so that the first component 105, second component 102, and/or joints 103 and/or 107 do not partially or fully separate when the two apparatuses are connected and/or disconnected.

As illustrated, the first magnetic unit 106 is coupled to the first component 105 and the second magnetic unit 104 is coupled to the second component 102. However, it is understood that this is an example. In various implementations, other configurations are possible.

For example, the first and/or second magnetic unit 106 and 104 may be a plurality of magnetic units without departing from the scope of the present disclosure. In some cases, the first and second magnetic units may be made up of a different number of magnetic units.

In another example, the first and/or second magnetic unit may be coupled to one or more intermediate components. The intermediate component may then be coupled to the first and/or second component 105 and 102 without departing from the scope of the present disclosure. Such intermediate components may be one or more mounting members and/or any other such intermediate structure.

In still another example, the first and/or second component 105 and 102 may themselves be the first or second magnetic units 106 and 104. In one example of such a case, the first and/or second component may be formed of a ferromagnetic material such as iron cobalt. As such, the first and/or second component may be magnetic and therefore have a magnetic attraction 108 to each other without requiring additional separate first and/or second magnetic units.

In various implementations, the apparatus 101 may be an electronic device. In such implementations, the electronic device may be any kind of electronic device such as a laptop computer, a tablet computer, a smart phone, a wearable device, a cellular telephone, a mobile computer, a digital media player, a desktop computer, a display device, a docking station, a charging device, a network device, an accessory device, a printer, and/or any other electronic device.

In such implementations, the electronic device may include one or more components that are not shown, such as one or more processing units, one or more non-transitory storage media (which may take the form of, but is not limited to, a magnetic storage medium; optical storage medium; magneto-optical storage medium; read only memory; random access memory; erasable programmable memory; flash memory; and so on), one or more communication components, one or more user interface components, and/or other such components. In some implementations, such components may be located in the internal space 120.

In various implementations where the apparatus 101 is an electronic device, the third magnetic unit 110 may be incorporated into an additional electronic device (which may be any electronic device such as any of the examples listed above) that is connectible to the electronic device. In such an implementation, the second component 102 may be an interface surface (which may be configured to mate and/or otherwise connect with one or more interface surfaces of the additional electronic device) and the second magnetic unit 104 and the third magnetic unit may operate to couple the two electronic devices.

In some implementations where the apparatus 101 is an electronic device and one or more components are located in the internal space 120, the first magnetic unit 106 may be a shield that shields such components from the magnetic flux of the second magnetic unit 104. Such a shield may be a direct current shield, which may be formed of a ferromagnetic material such as iron cobalt.

In various implementations, the first component 105 itself may be a component that is protected from a magnetic field of the second magnetic unit 104 by the first magnetic unit 106 functioning as a shield. For example, the apparatus 101 may be an electronic device and the first component may be a component of the electronic device such as a main logic board or other such component. In such a case, the first magnetic unit may be mounted to the main logic board in such a way that the first magnetic unit shields the main logic board and/or other elements of the main logic board from the magnetic field of the second magnetic unit.

Although the apparatus 101 is illustrated as having the first component 105 coupled to the housing 121 by joints 107 and the second component 102 coupled to the housing by joints 103, it is understood that this is an example. In various cases, the first component may be directly coupled to the second component by one or more joints.

Figure 2:
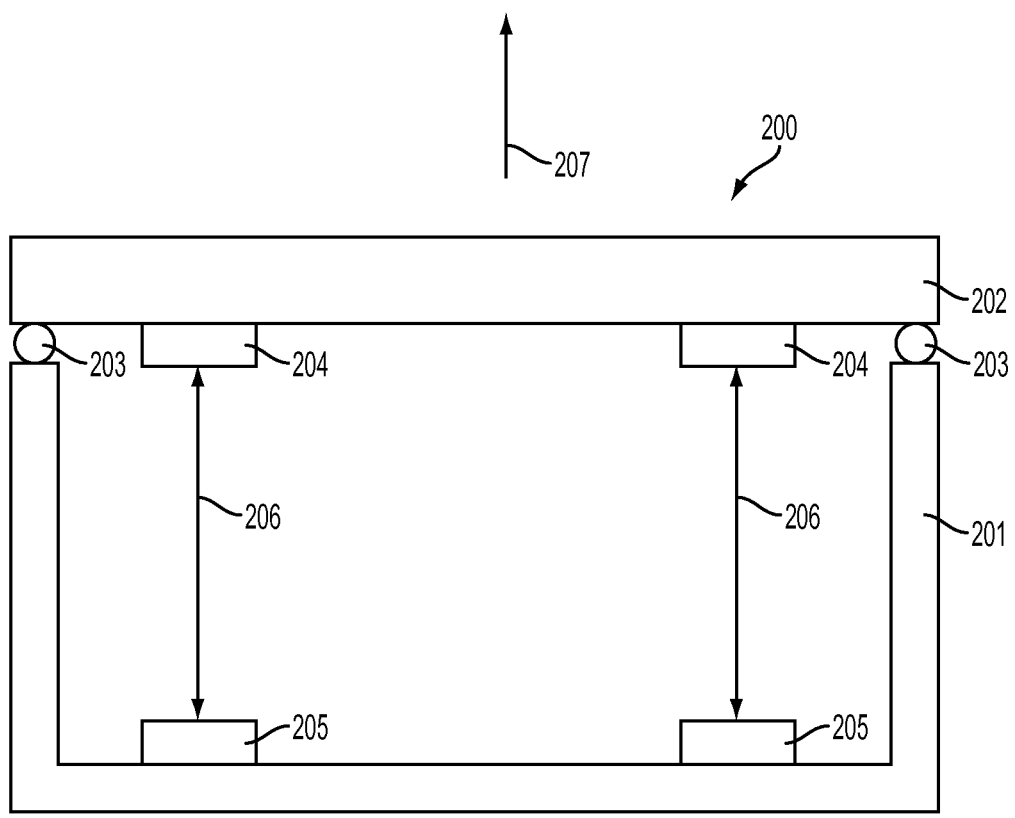
FIG. 2 is a side view of a second example system for magnetic preloading of joints.

FIG. 2 is a side view of a second example system 200 for magnetic preloading of joints. By way of contrast with FIGS. 1A and 1B, the system 200 illustrates a first housing component 201 of an apparatus coupled to a second housing component 202 by joints 203. Magnetic force 206 between first and second pairs of magnetic units 204 and 205 operates as a retentive force opposing and/or resisting any force exerted on the second housing component and/or the joints in the direction 207 (or upon the first housing component in the opposite direction), i.e. a tensile force. Such magnetic force may also resist one or more shear forces exerted on the first and/or second housing components and/or the joints.

For example, the first housing component 201 may be a main case for an electronic device and the second housing component 202 may be a cover glass. In such an example, the magnetic force 206 between the first and second pairs of magnetic units 204 and 205 may operate as a retentive force to prevent separation of the cover glass from the main case, the main case from the joints 203, and/or the cover glass from the joints when forces are exerted upon the cover glass (such as when a screen protector that is adhesively attached to the cover glass is removed) and/or the main case.

By way of another example, the first housing component 201 may be a container and the second housing component 202 may be a handle for the container. In such an example, the magnetic force 206 between the first and second pairs of magnetic units 204 and 205 may operate as a retentive force to prevent separation of the handle from the container when the container is picked up by the handle.

In yet another example, the first housing component 201 may be a pressurized canister and the second housing component 202 may be a lid for the pressurized canister. When pressure inside the pressurized canister exceeds that of an external environment, the pressure inside the pressurized canister may exert tensile and/or other force tending to separate the pressurized canister from the lid, the lid from the joints 203, and/or the pressurized canister from the joints. In such an example, the magnetic force 206 between the first and second pairs of magnetic units 204 and 205 may operate as a retentive force to prevent separation of the lid, pressurized canister, and/or joints as a result of such tensile and/or other force.

In still another example, the second housing component 202 may be a railing and the first housing component 201 may be a mounting bracket that couples the railing to a surface such as a wall. In such an example, the magnetic force 206 between the first and second pairs of magnetic units 204 and 205 may operate as a retentive force to prevent separation of the railing from the mounting bracket, the railing from the joint 203, and/or the joint from the mounting bracket when a user supports himself using the railing and/or otherwise exerts force upon the railing.

Figure 3:
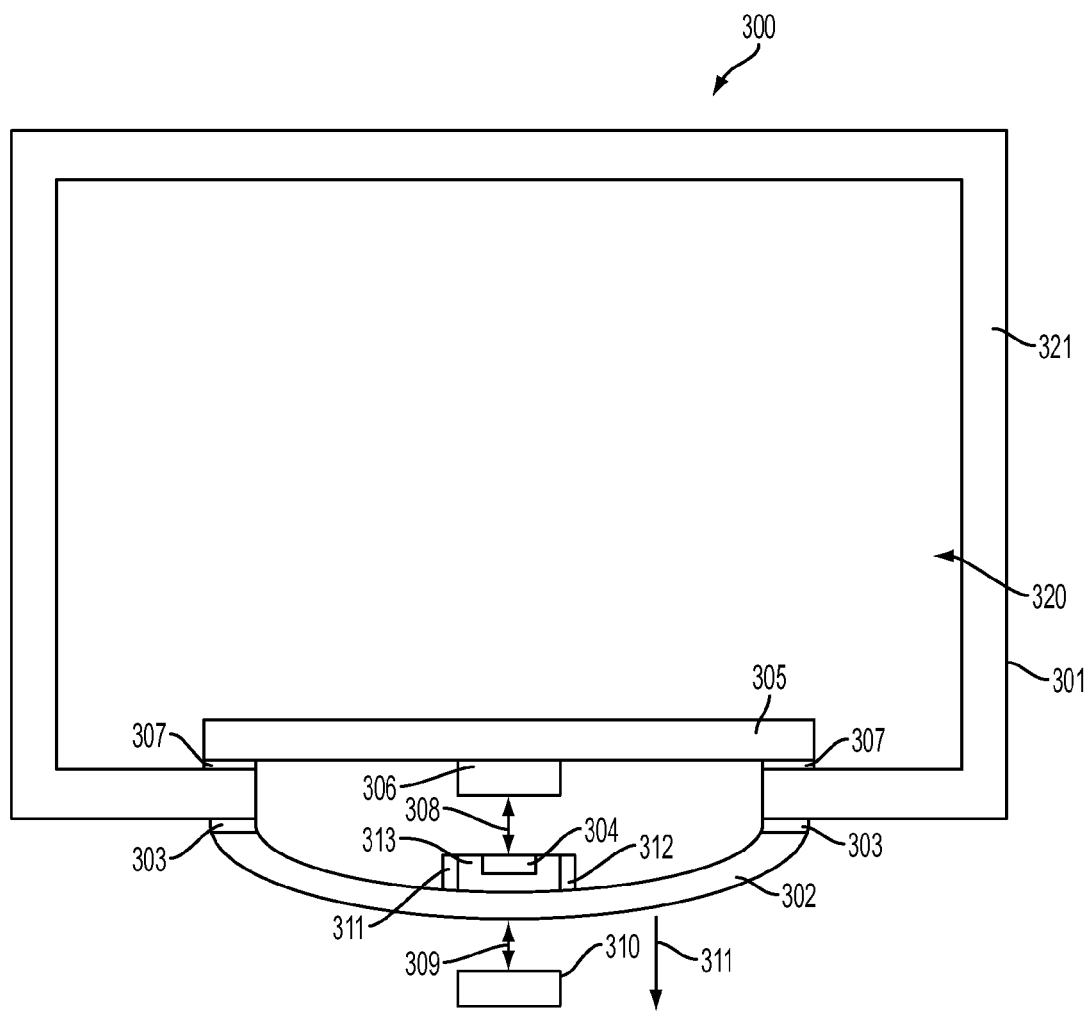
FIG. 3 is a side view of a third example system for magnetic preloading of joints.

FIG. 3 is a side view of a third example system 300 for magnetic preloading of joints. By way of contrast with FIGS. 1A and 1B, the second magnetic unit 304 of the system 300 may be coupled to the second component 302 by a tray member 313. Such a tray member may be formed of a material such as plastic and may include one or more side shields 311 and 312, which may be one or more direct current shields.

To further contrast with the system 100 illustrated in FIG. 1B, the tray member 313 of the system 300 may position the second magnetic unit 304 further from the first magnetic unit 306, though closer to the third magnetic unit 310. This may result in a weaker magnetic force 309 between the second and third magnetic units and a stronger magnetic force 308 between the first and second magnetic units than in the system 100 of FIG. 1B.

As a result, design of the system 300 may have more options available than the system 100 with respect to the factors influencing the magnetic force 308 between the first and second magnetic units 306 and 304, though fewer options available with respect to the factors influencing the magnetic force between the second magnetic unit and the third magnetic units 310.

Although the system 300 is illustrated and described as utilizing a tray member 313 to couple the second magnetic unit 304 to the second component 302, it is understood that this is an example. In various implementations, a variety of different coupling mechanisms may be utilized to couple the second magnetic unit to the second component and/or the first magnetic unit 306 to the first component 305.

Figure 4:
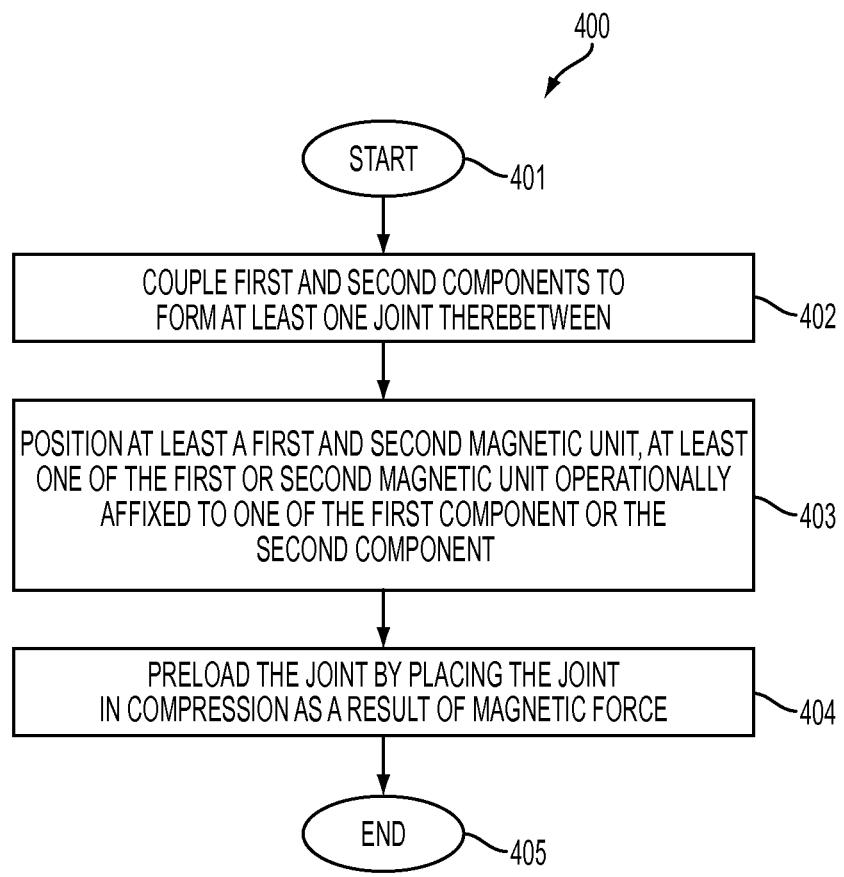
FIG. 4 is a flow chart illustrating an example method for magnetic preloading of joints. This example method may be performed by the example systems of FIG. 1A-B, FIG. 2, and/or FIG. 3.

FIG. 4 is a flow chart illustrating an example method 400 for magnetic preloading of joints. This example method may be performed by the example systems of FIG. 1A-B, FIG. 2, and/or FIG. 3.

The flow begins at block 401 and proceeds to block 402 where at least first and second components may be coupled to form at least one joint therebetween. Such components may be any components that are coupleable by one or more joints. Further, such a joint may be any kind of joint used to couple two or more components.

The flow then proceeds to block 403 where at least first and second magnetic units are positioned. Such positioning may include operationally affixing at least one of the first magnetic unit to the first component or the second magnetic unit to the second component. Further, such positioning may result in a magnetic force between the first and second magnetic units attracting each other.

Next, the flow may proceed to block 404 where the joint is preloaded by placing the joint in compression. The joint may be placed in compression as a result of the magnetic force between the first and second components. Such preloading may resist one or more tensile forces on the components or joint, shear forces on the components or joint, and/or other such forces.

The flow may then proceed to block 405 and end.

Although the example method 400 is illustrated and described as including particular operations performed in a particular order, it is understood that this is an example. In various implementations various configurations of the same, similar, and/or different operations may be performed without departing from the scope of the present disclosure.

For example, FIG. 4 illustrates blocks 403 and 404 of the example method 400 as separate operations performed in a linear order. However, in various implementations blocks 403 and 404 may be performed simultaneously.

By way of a second example, FIG. 4 illustrates blocks 402 and 403 of the example method 400 as separate operations performed in a linear order. However, in various implementations blocks 402 and 403 may be performed together, such as when performed as part of construction of an apparatus.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

Methods utilizing techniques described in the present disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A wearable electronic device, comprising:
   a housing;
   an electronic component positioned within the housing;
   a shield positioned within the housing and configured to shield the electronic component from a magnetic field;
   a housing component attached to the housing at a joint; and
   a magnetic unit coupled to the housing component;
   wherein a magnetic force between the shield and the magnetic unit places the joint in compression.

2. The wearable electronic device of claim 1, wherein the magnetic unit contributes to at least a portion of the magnetic field.

3. The wearable electronic device of claim 1, wherein:
   the housing component is operable to couple to an external electronic device;
   when the housing component is coupled to the external electronic device, a separating force is exerted on the joint; and
   the magnetic force between the shield and the magnetic unit is configured to resist the separating force.

4. The wearable electronic device of claim 3, wherein:
   the external electronic device includes an additional magnetic unit; and
   when the wearable electronic device is coupled to the external electronic device, an additional magnetic force is formed between the magnetic unit and the additional magnetic unit.

5. The wearable electronic device of claim 1, wherein the magnetic force between the shield and the magnetic unit is configured to retain the housing component to the housing.

6. The wearable electronic device of claim 1, wherein the shield is formed of iron cobalt.

7. The wearable electronic device of claim 1, wherein the housing component is formed of ceramic.

8. A wearable electronic device, comprising:
   a housing;
   a logic board positioned within the housing;
   a magnetic shield proximate to the circuit board and configured to shield the circuit board from a magnetic field;
   a component forming a portion of an external surface of the wearable electronic device; and
   a magnetic unit coupled to the component; wherein the component and the housing meet at a joint; and a magnetic force between the magnetic shield and the magnetic unit biases the joint toward compression.

9. The wearable electronic device of claim 8, further comprising:

a tray coupled to the housing component; wherein:

the magnetic unit is coupled to the housing component via the tray.

10. The wearable electronic device of claim 9, wherein the tray is formed of plastic.

11. The wearable electronic device of claim 9, further comprising an additional shield coupled to the tray.

12. The wearable electronic device of claim 11, wherein the additional shield is positioned in a location other than between the magnetic shield and the magnetic unit.

13. The wearable electronic device of claim 8, wherein:

the joint is a first joint; and the magnetic force between the magnetic shield and the magnetic unit compresses a second joint between the logic board and the housing.

14. The wearable electronic device of claim 13, wherein the first joint and the second joint are disposed on opposite surfaces of the housing.

15. A wearable electronic device, comprising:

a housing;

a shield disposed in the housing;

an electronic component disposed in the housing;

a housing component meeting the housing at a joint; and a magnetic unit coupled to the housing component; wherein:

the shield blocks the electronic component from a magnetic field of the magnetic unit; and magnetic force between the shield and the magnetic unit is configured to produce a compressive force on the joint.

16. The wearable electronic device of claim 15, wherein the magnetic force between the shield and the magnetic unit is operable to resist a shear force exerted on the joint.

17. The wearable electronic device of claim 15, further comprising a side shield wherein:

the side shield is an iron cobalt shield;

the magnetic unit has a first surface facing the shield;

the magnetic unit has a second surface perpendicular to the first surface; and the side shield is coupled to the second surface.

18. The wearable electronic device of claim 15, wherein the shield is coupled to the electronic component.

19. The wearable electronic device of claim 15, wherein the magnetic force between the shield and the magnetic unit is operable to resist a tensile force exerted on the joint.

20. The wearable electronic device of claim 15, further comprising an adhesive disposed within the joint.

* * * * *